United States Patent [19]

Mostafa

[11] Patent Number: 4,597,998
[45] Date of Patent: Jul. 1, 1986

[54] HIGH SOLIDS OIL FREE POLYESTER INDUSTRIAL PROTECTIVE COATING

[76] Inventor: Yehra A. Mostafa, 94 Hazzard St., Jamestown, N.Y. 14701

[21] Appl. No.: 670,648

[22] Filed: Nov. 13, 1984

Related U.S. Application Data

[63] Continuation-in-part of Ser. No. 448,641, Dec. 10, 1982, abandoned.

[51] Int. Cl.$^4$ .......................... B05D 3/02; C08K 5/42
[52] U.S. Cl. .................................. 427/387; 427/385.5;
427/388.3; 427/393.5; 427/435; 524/158;
524/315; 524/317; 524/364; 524/447
[58] Field of Search ............... 524/158, 315, 447, 364,
524/317; 427/388.2, 388.3, 388.5, 385.5, 393.5,
435, 387

[56] References Cited

U.S. PATENT DOCUMENTS

| | | | |
|---|---|---|---|
| 3,436,367 | 4/1969 | McInerney | 428/458 X |
| 4,195,102 | 3/1980 | Turpin | 427/27 |
| 4,206,264 | 6/1980 | Kurr | 428/458 |
| 4,268,547 | 5/1981 | Backhouse | 427/385.5 |
| 4,272,291 | 6/1981 | Shtern et al. | 106/14.05 |
| 4,326,888 | 4/1982 | Frew | 106/14.14 |

*Primary Examiner*—Thurman K. Page
*Attorney, Agent, or Firm*—Renee S. Rutkowski; Warren N. Low

[57] ABSTRACT

An oil free polyester high solids formulation giving a protective coating having corrosion resistance, surface hardness. The coating includes a highly methylated melamine cross-linking agent; an acid catalyst; a polar solvent system; wetting, defoaming and anti-sagging agents; and pigments. The composition has low VOC, high solids content, and controlled viscosity. It may be applied by hot tank dipping, flow coating, air or electrostatic spraying, with subsequent curing at 300°–350° F. for about 20 minutes.

18 Claims, No Drawings

HIGH SOLIDS OIL FREE POLYESTER INDUSTRIAL PROTECTIVE COATING

This application is a continuation-in-part of Ser. No. 448,641 filed Dec. 10, 1982 now abandoned.

BACKGROUND OF THE INVENTION

The present invention relates to the production of industrial coatings for metal products. More specifically it relates to the class of industrial coatings known as high solids, oil-free polyester coatings which also have low volatile organic compounds (VOC). It relates to such above coatings which are applied to steel or other metal substrates by the process of hot tank dipping, flow coating, air or electrostatic spraying, and cured by heating to a temperature of 300°–350° F. for a period of time.

High solids coatings of several types are known in the art. The following are known to the applicant and disclosed in U.S. Pat. Nos. 2,284,241—Werntz, 3,436,367—McInerney, 3,485,781—Wallman et al, 4,195,102—Turpin, 4,206,264—Kurr, 4,243,705—Yapp et al, 4,268,547—Backhouse, 4,272,291—Shtern, 4,322,508—Peng et al, and 4,326,888—Frew.

Examination of the prior art reveals compositions for a coating suitable for hot tank dipping. Other compositions appear to be suited for electrostatic spraying or conventional spraying. No compositions have been found which are suitable for either hot tank dipping or spraying, nor any which are stable in a hot dip tank for long periods of time, without congealing, and without substantial solvent loss. Several compositions with desirable features are unable to meet current Environmental Protection Agency guidelines and OSHA requirements. The compositions found in the prior art are unsatisfactory for application to substrates having sharp corners, projections, bolt holes and similar irregularities in shape because of their tendency to run, drip and tear.

The present invention is suitable for use on all surface configuration is including those having rounded or curvilinear shapes, and substrates affixed to any orientation, yielding a coating having a uniform thickness between 1.0 and 1.5 mils on the substrate, and is suitable for prolonged use in a hot dip tank without degradation of the materials.

SUMMARY OF THE INVENTION

It is, therefore, an object of the present invention to provide a coating composition for application by hot tank dipping, flow coating, electrostatic or conventional spraying, which will result in a uniform protective coating having a thickness between 1.0 and 1.5 mils at all points on the substrate, and which is suitable for industrial use on substrates of any shape or orientations, including those with curvilinear surfaces and having holes and projections.

It is a further object of the invention to provide a coating composition which requires no primer or undercoat, is lead and chrome free and which yields a high degree of surface hardness when cured.

It is an object of the present invention to provide an oil free high solids polyester industrial coating where the solids are 80 to 95% by weight in the oil free polyester.

It is also an object of the present invention to provide a composition for application to metal substrates to result in a protective coating which is suitable for use in a hot tank dipping process wherein the coated metal substrate, upon removal from the tank, is free from dripping and devoid of runs and tears.

It is a further object of the present invention to provide a composition which can remain in a hot dip tank 24 hours a day, 7 days a week, while maintaining the same VOC, and viscosity, resistance to gelling, and requiring at most the addition of a small amount of reducer in each 24 hour period, without noticeable change in actual specifications of the paint.

It is also an object of the present invention to provide a composition having a low content of volatile organic compounds, known as the VOC, meeting the United States Government EPA regulations, as well as the OSHA regulations.

It is an object of the invention to provide a composition which results in an industrial coating which is stain and mar resistant, lead and chrome free, chip and impact resistant, can withstand a 180° bend over a ¼ inch mandrel, and has excellent adhesion to the substrate without the use of primers.

It is also an object of the present invention to provide a composition which results in an industrial coating which is corrosion resistant as determined by meeting the standard corrosion test of 500 hours of exposure to a 5% NaCl solution at 100° F. without damage to either the coating or the substrate.

These and other objects of the present invention, together with the advantages over the prior art, which will become apparent from the detailed description of the best mode, are accomplished by the composition and the method of producing it hereinafter described and claimed.

DETAILED DESCRIPTION

In accordance with the present invention, a high solids oil-free polyester coating, suitable for use on industrial substrates such as steel truck wheels is prepared. The coating is corrosion resistant, chip and mar resistant, and flexible to a 180° bend over a ¼ inch mandrel.

More specifically, this invention relates to a high solids coating, e.g. about 70% total solid content, comprises about 29–34 wt % of an oil-free polyester; about 9.5–12.5 wt % of a highly methylated melamine cross-linking agent such as hexamethoxy methyl melamine; a polar solvent system which is a mixture of ketones, esters, glycol ethers and alcohols and mixtures thereof; and an acid catalyst such as p-toluenesulfonic acid.

In addition the coating composition of this invention includes pigments, suspension agents, corrosion inhibitors, wetting agents and defoamers.

The corrosion resistant coating composition as described above includes an oil-free polyester having about 80–95% non-volatile solids by weight, and a cross-linking agent of hexamethoxy methyl melamine, which is 98% non-volatile, having a methyl content about 1.5%.

The solvent system for the coating composition is a mixture of polar solvents including: ketones, selected from the group of methylamyl ketone, diisobutyl ketone, and methylethyl ketone; esters, selected from the group of cellosolve acetate, and normal butyl cellosolve; and alcohols selected from n-butyl alcohol and methyl alcohol.

The solvent system of the present invention plays a particular function in the benefits achieved by the instant composition. The use of the combination of polar solvents promotes stability in the coating evidenced by the absence of phase separation, and even distribution of solid content with minimal or no agitation. In addition, the specific combination of particular solvents results in the low viscosity despite the high solids content and low VOC (volatile organic content). The specific solvent system produces an even rate of solvent evaporation, and in combination with the rheological additives, minimal settling, good flow rate and good viscosity.

The pigments included in the instant coating formulation may be selected from bon black, phthalocyanine blue, and titanium dioxide. In addition fume silica and bentonite are included which both function as suspension, and antisagging agents, providing a non-settling, non-sagging composition and to obtain the uniform specific cured film thickness as, 1.0–1.5 mil and zinc phosphate which functions as a corrosion inhibitor, as well as a color pigment.

The acid catalyst for the disclosed formulation is preferably a block acid catalyst such as 20% p-toluene sulfonic acid in 80% alcohol, and butyl cellosolve.

Other additives may include, flow agents/wetting agents, surfactants, organosilicone as a flow and antisagging agent and defoamers.

The defoamer, preferably DC7, a Dow Chemical alkylhalogensilane, functions as an anti-bubbling agent, preventing the entrapment of bubbles in the coating composition which might cause deformation to the coated product. The defoamer should be heat stable, as is that indicated above, so that it will not break down in the heated dip tank.

The coating formulation may be maintained in a hot dip tank at 115°–125° F. with no loss of stability, no increase in viscosity, with the only required addition of a small amount of reducer once every 24 hours.

The present invention yields a coating formulation having an application viscosity of 20–25 second measured by #3 Ford cup at 100° F., and a VOC (volatile organic compounds) of 3.0 to 3.5 pound per gallon.

The hardness, flexibility and corrosion resistance of the cured coating, as well as the high stability of the wet film (under 125° F.) for extended periods of time, are the result of a formulation that considers the following factors: (a) the electric properties of the components, particularly the solvents; (b) the polarity of the compound as a whole; (c) the molecular weight-size of the vehicle, and the solvents which vehicle acts as a cohesive bond to produce strength; (d) the addition of zinc, the metal composition of the corrosion inhibitor pigment which acts to prevent electronic and electrolytic elements from corrosion, and the other corrosion elements.

The optimum coating performance results from the special relation between the low VOC, the viscosity and the solid content which is controlled by the specific components and their quantity as a percent of the total disclosed herein as the best mode, particularly during the hot dip application and its relation to such irregular articles to be coated.

The present invention may be more fully understood by referring to the following two examples, each employing a different oil-free polyester. The parts are given by weight and in percent.

The examples will teach those skilled in the art how to practice the invention and are not intended to limit the scope of the invention in any way, but illustrate the best mode of the invention.

EXAMPLE I

This illustrates the preparation of the high solids, oil-free polyester composition by using Cargill #5774-95 oil-free polyester, which is 95% solids by weight.

The following ingredients are used to produce 106.4 gallons:

|     | Component | Pounds | Percent |
| --- | --- | --- | --- |
| 1. | Oil Free Polyester (such as Cargill 5774-95) | 332.72 | 29.46 |
| 2. | cellosolve acetate | 87.95 | 7.79 |
| 3. | methylethyl ketone | 33.97 | 3.01 |
| 4. | methylethyl ketone | 19.46 | 1.72 |
| 5. | High molecular weight unsaturated polycarboxylic acid - silicone resin antifloating, wetting and dispersing agent (such as BYK-Mallinckrodt BYK P 104S) | 5.18 | 0.46 |
| 6. | Smectite clay (such as NL Industries BENTONE 38) | 3.25 | 0.29 |
| 7. | methanol | 1.52 | 0.13 |
| 8. | titanium dioxide | 122.14 | 10.81 |
| 9. | Bon black (such as Ebonex Corporation's Cosmic Black D2) | 17.56 | 1.55 |
| 10. | china blue (phtholo cyanine Blue) | 0.31 | 0.03 |
| 11. | zinc phosphate | 165.00 | 14.61 |
| 12. | hydrophobic silicon dioxide (such as Degussa AEROSIL 972) | 1.80 | 0.16 |
| 13. | hexamethoxy methyl melamine | 140.65 | 12.45 |
| 14. | diisobutyl ketone | 81.67 | 7.23 |
| 15. | N—butyl alcohol | 40.00 | 3.54 |
| 16. | N—butyl acetate | 18.15 | 1.61 |
| 17. | butyl cellosolve | 42.75 | 3.78 |
| 18. | polyalkylene oxide modified dimethyl polysiloxane copolymer flow additive (Union Carbide Silwet 7605) | 2.75 | 0.24 |
| 19. | Amine blocked paratoluene sulphonic acid (Byk Catalyst VP-450 by BykMallinckrodt) | 9.00 | 0.80 |
| 20. | alkylhalogenosilane paint defoamer (Dow Corning DC-7) | 3.63 | 0.32 |
|     |     | 1,129.46 |     |

In a stone ball mill or pebble mill with porcelain lining, 60 to 70% of the total quantity of oil-free polyester, 85% of the cellosolve acetate, the methylamyl ketone, and the wetting agent BYK P 104-S are charged and the mill is spun for 15 minutes. The wetting agent works as a dispersant and surfactant while these ingredients are in the mill.

In a separate container the gellant phase is prepared by mixing the Bentone 38 with the methanol. This gellant phase is added to the mill and the mill spun for an additional 10 to 20 minutes.

The titanium dioxide, the black, the blue, the fume silica and the zinc phosphate, which are the pigments for color, corrosion resistance, and surface hardness, are added to the mill. The mill is operated unit a 6+ grinder reading is obtained, which should require a minimum of 16 hours.

The let down phase is prepared in a separate tank by combining the remaining 40 to 30% of the total quantity of the oil-free polyester, the melamine cross linker, the N-butanol and the butyl cellosolve. A portion of the solvents is reserved to be used as a mill-wash. A mixer is activated to mix the contents of the tank. A low power, low speed is used in order not to trap air bubbles and produce foaming.

The mill contents are emptied into the let down tank and the reserved solvents employed as a mill-wash. The wash is drained into the tank.

The flow additive solution is prepared in a separate container with a 1 to 1 mix of polyalkyleneoxide modified dimethyl polysiloxane copolymer flow additive, here Union Carbide Silwet 7605 butyl cellosolve, then added to the let down tank under slow agitation.

Under very slow agitation, the acid catalyst is added to the let down tank. Slow agitation is resumed.

The defoamer solution is prepared in a separate container by combining the defoamer additive; here an alkylhalogensilane paint defoamer, Dow Corning DC-7 with the methylethyl ketone. Then under slow agitation, the solution is added to the let down tank.

The composition is released from the let-down tank by mechanical pumping or by cone filter to containers, which are then sealed for distribution.

The solvent system in this example results in very low VOC due to the combinations shown in the following table. The solvent system produces the required high solid and the low viscosity and is the primary cause of uniform viscosity over time, and the excellent paint stability (heat stability) at 115°–120° for such long periods of time and to the resultant physical and mechanical cured film performance.

| Name | Amt. per pound | % of Total | Flash point open cup | Evap. rate* |
|---|---|---|---|---|
| cellosolve acetate | 87.41 | 27.26 | 130° F. | 0.2 |
| metnyl amyl ketone | 33.97 | 10.59 | 102° F. | 0.2 |
| diisobutyl ketone | 81.67 | 25.47 | 127° F. | 0.2 |
| n-butyl cellosolve | 18.15 | 5.66 | 81° F. | 1.0 |
| butyl cellosolve | 40.00 | 12.47 | 138° F. | 0.06 |
| n-butyl alcohol | 40.00 | 12.47 | 100° F. | 0.5 |
| methyl ethyl ketone | 19.46 | 6.10 | 25° F. | 4.0 |

*Evaporation rate relative to n-butyl acetate = 1.0

For the hot tank dipping method of application the tank temperature is maintained between 110° and 120° F., which results in the very low VOC for the specific combination of solvents shown. The solvent system has 88.25% with flash points in the range 100° to 138° F., 5.66% with a flash point of 81° F. and 60.8% with a flash point of 25° F.

The fume silica, in an amount approximating 0.5% of the total pigments, helps to suspend the heavy pigments, keeping them from settling to the bottom of the dip tank and results in a uniform cured film thickness of from 1.0 to 1.5 mil.

EXAMPLE 2

This example illustrates the preparation of the high solids, oil-free polyester composition by using Spencer Kellogg Aroplaz, #6755 AL-80 oil free polyester, which is 80% solids by weight.

| Component | Pounds | Percent |
|---|---|---|
| 1. High solids oil free polyester resin (Spencer-Kellogg Aroplaz 6755 AL-80) | 388.41 | 34.07 |
| 2. cellosolve acetate | 73.88 | 6.48 |
| 3. High molecular weight unsaturated polycarboxylic acid - silicone resin antifloating, and wetting dispersing agent (such as Byk-Mallinckrodt BYK P 104S) | 5.28 | 0.46 |
| 4. methylamyl ketone | 70.37 | 6.17 |
| 5. titanium dioxide | 166.24 | 14.58 |
| 6. Bob black (such as Ebonex Corp.'s Cosmic Black D2) | 23.96 | 2.10 |
| 7. china blue (phthalocyanine Blue) | 0.40 | 0.04 |
| 8. zinc phosphate | 182.00 | 15.97 |
| 9. fume silica | 7.00 | 0.61 |
| 10. monomeric hexamethoxymethyl melamine (American Cyanamid Cymel 303) | 106.00 | 9.30 |
| 11. N—butanol | 35.18 | 3.09 |
| 12. N—butyl acetate | 61.22 | 5.37 |
| 13. Polyalkylene oxide modified dimethyl (polysiloxane copolymer flow additive Union Carbide Silwet 7605) | 3.50 | 0.31 |
| 14. butyl cellosolve | 3.50 | 0.31 |
| 15. Amine blocked paratoluene sulphonic acid (Byk catalyst VP-450 by Byk Mallickrodt) | 7.00 | 0.61 |
| 16. aklylhalogenosilane paint defoamer (Dow Corning DC-7) | 6.00 | 0.53 |
| | 1,139.94 | |

One skilled in the art, by referring to the detailed description given in Example 1, can readily practice the invention with the ingredients contained herein above in Example 2.

Cure of the coating is effected by exposing the coated substrate to a temperature of 300°–350° F. for about 20 minutes.

The resulting dry film coating has a thickness between 1.0 and 1.5 mil, humidity resistance at 100° F. for 300 hours, is flexible to a 180° bend over a ¼ inch mandrel, is impact resistant as direct 160 inch/pounds-reverse 100 inch/pounds and a surface hardness measured at 4H.

Although the present invention has been described in considerable detail, and with specific quantities of the ingredients, and the manner of making and using the same in a preferred embodiment, it will be understood that variations and modifications may be made within the spirit and scope of the invention. Accordingly, the invention should be considered within a scope of the appended claims.

What I claim is:

1. A high solids containing composition capable of being cured by heat, comprising:
   (a) an oil free polyester
   (b) a polar solvent system including an ether, a ketone or mixture thereof, an alcohol and a glycol ether, wherein a major proportion of the solvents have a flash point in the range of 100° F. to 138° F., and minor proportions of the solvents have flash points of 81° F. and 25° F., respectively,
   (c) a melamine cross-linking agent
   (d) a bentonite gellant
   (e) an acid catalyst
   (f) pigments that are lead and chrome free.

2. The composition of claim 1 wherein the total solids content is about 70 wt %.

3. The composition of claim 1 wherein the oil-free polyester is about 80–95 wt % solids.

4. The composition of claim 1 wherein 88.25% of the solvents have flash points in the range 100° to 138° F., 5.66% have a flash point of 81° and 6.08% have a flash point of 25° F.

5. The composition of claim 1 wherein the polar solvent system consists essentially of 27.26% cellosolve acetate, 10.59% methyl amyl ketone, 25.47% diisobutyl ketone, 5.66% n-butyl acetate, 12.47% butyl cellosolve, 12.47% n-butyl alcohol and 6.10% methyl ethyl ketone.

6. The composition of claim 1 wherein the melamine cross-linking agent is the monomeric type hexamethoxymethyl melamine.

7. The composition of claim 1 wherein the pigment for corrosion resistance is zinc phosphate.

8. The composition of claim 1 further including a specific defoaming agent.

9. The composition of claim 1 further including a specific wetting agent.

10. The composition of claim 1 wherein the catalyst is p-toluene sulfonic acid.

11. Wherein the pigment may be chosen from the group comprising color pigments, corrosion inhibitor pigments, pigments to aid suspension, or a mixture thereof.

12. The composition of claim 11 wherein 0.59% of the total pigment is hydrophobic silica.

13. The composition of claim 11 wherein the pigment for corrosion resistance is zinc phosphate.

14. The composition of claim 11 wherein the color pigments include phthalocyanine blue and carbon black, and titanium dioxide.

15. A method of coating a substrate with a high solids composition capable of being cross-linked by heat and acid catalyst which comprises the steps of:
   a. mixing in a mill, oil free polyester, cellosolve acetate, methylamyl ketone, and a wetting agent;
   b. mixing a gellant of bentonite and methanol;
   c. adding the gellant to the mill;
   d. adding the pigments titanium dioxide, carbon back, china blue, silica and zinc phosphate to the mill;
   e. operating the mill until a 6+ grinder reading is obtained;
   f. preparing a let down phase in a tank by combining oil free polyester, melamine cross-linking agent, n-butyl aceteate, diisobutyl ketone, n-butanol, and butyl cellosolve; and methyl ethyl ketone (MEK).
   g. mixing the contents of the let down tank at a low speed;
   h. emptying the mill contents into the let down tank;
   i. adding as a catalyst p-toluol sulfonic acid to the let down tank; under slow mixing;
   j. adding the defoamer solution, comprising a mixture of alkylhalogensilane with methyethyl ketone, to the let down tank under slow agitation;
   k. pouring the composition from the let down tank into a hot dip tank at a temperature between 110° and 120° F.;
   l. dipping the substrate into the composition;
   m. removing the coated substrate from the dip tank; and
   n. baking the coated substrate at 300° to 350° F. for 20 minutes;

16. The method of claim 15 wherein the oil-free polyester is about 80–95 wt % solids.

17. The method of claim 15 wherein 88.25% of the solvents have flash points in the range 100° to 130° F., 5.66% have a flash point of 81° F. and 6.08% have a flash point of 25° F.

18. The method of claim 15 wherein additionally a flow additive solution comprising a polyalkyleneoxide modified dimethyl polysiloxane is mixed with butyl cellosolve in a 1:1 ratio is added to the tank under slow agitation prior to the addition of the acid, and the defoamer.

* * * * *

UNITED STATES PATENT OFFICE
CERTIFICATE OF CORRECTION

PATENT NO. : 4,597,998
DATED : July 1, 1986
INVENTOR(S) : YEHIA A. MOSTAFA

It is certified that error appears in the above-identified patent and that said Letters Patent are hereby corrected as shown below:

The inventor's name on the face page of the patent should read:

Inventor:  Yehia A. Mostafa

Signed and Sealed this

Tenth Day of February, 1987

Attest:

DONALD J. QUIGG

Attesting Officer

Commissioner of Patents and Trademarks